(12) United States Patent
Choi

(10) Patent No.: US 8,116,824 B2
(45) Date of Patent: Feb. 14, 2012

(54) MOBILE TERMINAL AND KEY INPUT METHOD THEREOF

(75) Inventor: Jung-Eun Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 479 days.

(21) Appl. No.: 12/127,398

(22) Filed: May 27, 2008

(65) Prior Publication Data

US 2009/0131117 A1 May 21, 2009

(30) Foreign Application Priority Data

Nov. 20, 2007 (KR) .......................... 10-2007-0118844

(51) Int. Cl.
*H04B 1/38* (2006.01)
*H04M 1/00* (2006.01)
(52) U.S. Cl. ...................... 455/566; 455/575.3; 345/173
(58) Field of Classification Search .................. 455/566, 455/575.3; 345/173
See application file for complete search history.

(56) References Cited

U.S. PATENT DOCUMENTS

| | | | |
|---|---|---|---|
| 6,876,876 B2* | 4/2005 | Uhlemann | 455/575.3 |
| 2004/0092284 A1* | 5/2004 | Satoh et al. | 455/550.1 |
| 2004/0106439 A1* | 6/2004 | Garroch | 455/566 |
| 2005/0157174 A1* | 7/2005 | Kitamura et al. | 348/207.99 |
| 2006/0284855 A1 | 12/2006 | Shintome | |
| 2008/0004082 A1* | 1/2008 | Bloebaum | 455/566 |
| 2008/0009330 A1* | 1/2008 | Jung et al. | 455/575.3 |
| 2008/0036743 A1* | 2/2008 | Westerman et al. | 345/173 |
| 2008/0310517 A1* | 12/2008 | Kitatani | 375/240.25 |

FOREIGN PATENT DOCUMENTS

| | | | |
|---|---|---|---|
| EP | 1408673 A2 | 4/2004 | |
| EP | 1587286 A2 | 10/2005 | |
| EP | 1670218 A1 | 6/2006 | |
| WO | WO-2005/062581 A1 | 7/2005 | |

* cited by examiner

*Primary Examiner* — Wen Huang

(74) *Attorney, Agent, or Firm* — Birch, Stewart, Kolasch & Birch, LLP

(57) ABSTRACT

A mobile terminal, method and computer program product for transferring a currently displayed first display from a first touchscreen of a first display unit on an outer surface of a first body of a device to a second display unit on an inner surface of the first body or on an inner surface of a second body of the device when the device is opened, and subsequently executing a predetermined function upon receiving a first touch input to the first touchscreen.

12 Claims, 7 Drawing Sheets

MOBILE TERMINAL AND KEY INPUT METHOD THEREOF

CROSS REFERENCE TO RELATED APPLICATIONS

The present application is related to, and claims priority to Korean Patent Application No. 10-2007-0118844 filed on Nov. 20, 2007, the entire contents of which are incorporated herein by reference.

BACKGROUND

1. Field of the Invention

The present invention relates to a mobile terminal, computer program product and method for making key inputs in a multi-input manner by pressing mechanical buttons, and performing touch screen inputs while holding the mobile terminal.

2. Discussion of the Background Art

Mobile terminals may be configured to perform various functions. Such functions may include a data and voice communications, capturing images or videos through a camera, voice or other audio storage, music file reproduction, image or video displays, and the like. Some mobile terminals may be capable of executing games while others may be implemented as multimedia devices. Recently, mobile terminals have been configured to receive broadcast or multicast signals to allow users to watch video or television programs.

In the related art, when the user inputs keys to perform a particular function (such as inputting characters or menu selection in a mobile terminal having a key input function through buttons or a touch operation), the user is forced to change the way in which he holds the terminal to manipulate key buttons or inputs keys in a tactile manner (touch manner).

In the related art, when keys are input for performing a particular function such as text inputting or menu selection, the user is forced to hold the mobile terminal in a different manner depending on whether buttons need to be pressed or touch (or tactile) operations need to be performed for key inputting.

For example, when performing key inputting by pressing buttons (such as for text inputting), the user typically holds his mobile terminal in both hands and uses both thumbs to press buttons on a keypad, and when performing key inputting via touch screen inputs, the user typically holds his mobile phone in one hand and uses his other hand to make touch screen inputs (e.g., using his finger tips or a stylus to touch on-screen buttons, using a stylus to write text, etc.).

Accordingly, the user cannot manipulate his mobile terminal quickly and should change the way he holds his mobile terminal depending upon the type of key input method he wishes to use, which is quite inconvenient and cumbersome.

SUMMARY

The present inventors recognized certain drawbacks of the related art, as explained above. Upon such recognition, the following concepts and features have been conceived. Thus, the present invention is related to a method, device and computer program product for transferring a currently displayed first display from a first touchscreen of a first display unit on an outer surface of a first body of a device to a second display unit on an inner surface of the first body or on an inner surface of a second body of the device when the device is opened, and subsequently executing a predetermined function upon receiving a first touch input to the first touchscreen.

Thus, a mobile terminal allowing a user to input keys in a multi-input manner, for example, both by pressing buttons and by performing a touch operation while holding the mobile terminal in his hand, and its key input method are provided.

Also, a mobile terminal allowing a user to perform touch inputs with fingers that are not currently used for performing key button inputs, while holding the mobile terminal having a Qwerty keyboard, and its key input method are provided herein.

In addition, a mobile terminal having displays on front and rear surfaces of a folder which is opened and closed in a foldable manner, wherein an output is changed from the front display to the rear display according to whether or not the folder is opened and a touch input is performed through the front display, and its key input method are provided herein.

In addition, a mobile terminal having displays on front and rear surface of a folder, wherein the same or different information are displayed on the both displays when the folder is opened, and a touch input is received through at least one display and a particular function outputted to the other display is executed, and its key input method are provided.

Thus, a mobile terminal includes: a first body including first and second display units on front and rear surfaces thereof and having at least one side opened with respect to a second body; and a controller that changes an output from the first to the second display when the first body is opened, and executing a particular function upon receiving a touch input to the first display.

Also a mobile terminal including a first body having at least one side opened with respect to a second body and including first and second display units on front and rear surfaces thereof, wherein when the first body is opened, a controller changes an output of the first display to the second display, detects a touch input on the first display to display the touch input information on the second display, and executes a particular function displayed on the second display according to a touch input position or a touch method.

The present invention has the following advantages.

That is, first, when performing key inputs in the mobile terminal, the user can perform key inputs in a multi-manner by using buttons or touches while maintaining the way the user holds the mobile terminal, to thus improve user convenience.

Second, when the user inputs keys in the mobile terminal, he can perform a touch input with other fingers that are not in use for inputting key buttons while holding the mobile terminal, thus improving user convenience.

Third, in the mobile terminal having the displays on the front and rear surfaces of the folder, an output can be changed from the front display to the rear display according to whether or not the folder is opened, and a touch input can be received through the front display to execute a particular function outputted on the rear display, thus improving user convenience.

Fourth, in the mobile terminal having the displays on the front and rear surfaces of the folder, when the folder is opened, the same or different information may be displayed on both displays, and a touch input can be received through at least one display to execute a particular function outputted on the other display.

DETAILED DESCRIPTION

Figure 1:
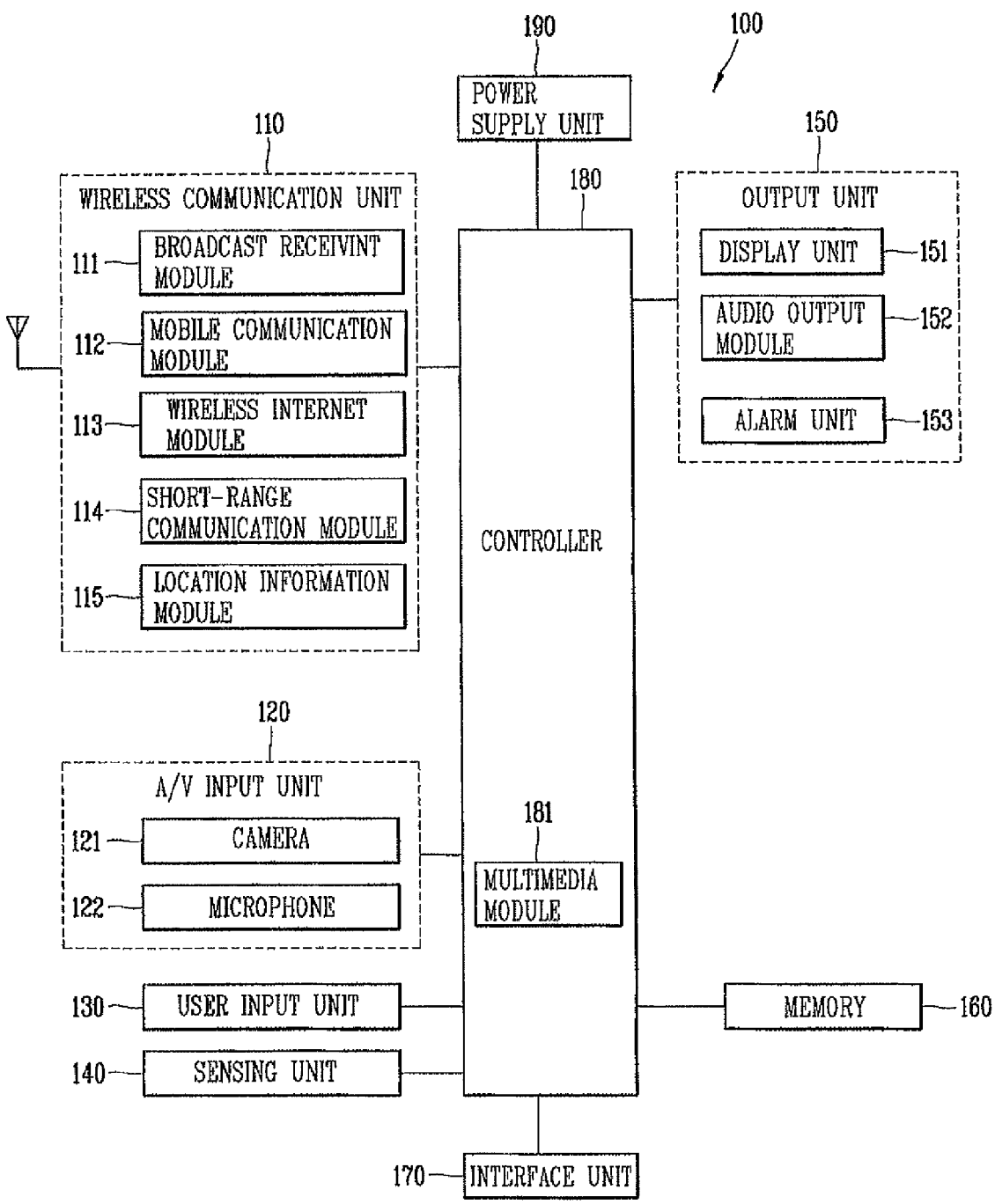
FIG. 1 is a block diagram of a mobile terminal according to an embodiment of the present invention.

Various embodiments of the present invention will now be described in detail with reference to the accompanying drawings. In describing the present invention, if a detailed explanation for a related known function or construction is considered to unnecessarily divert the gist of the present invention, such explanation has been omitted but would be understood by those skilled in the art. Elements performing the same function are used for the same reference numerals.

The mobile terminal according to exemplary embodiments of the present invention will now be described in detail.

FIG. 1 is a block diagram of a mobile terminal according to an embodiment of the present invention.

The mobile terminal may be implemented in various forms. For example, the terminals according to the exemplary embodiment of the present invention may include mobile phones, smart phones, notebook computers, DMB (Digital Multimedia Broadcasting) terminals, PDAs (Personal Digital Assistants), PMPs (Portable Multimedia Players), navigation, and the like.

The mobile terminal 100 as shown in FIG. 1 may comprise a wireless communication unit 110, an audio/video (A/V) input unit 120, a user input unit 130, a sensing unit 140, an output unit 150, a memory 160, an interface unit 170, a controller 180, and a power supply unit 190, and the like.

The mobile terminal as shown in FIG. 1 includes various elements. However, it is understood that implementing all the illustrated elements is not a requirement. Namely, the mobile terminal may be implemented with greater or fewer elements.

The elements will now be described.

The wireless communication unit 110 may include one or more components which permits wireless communication between the mobile terminal 100 and a wireless communication system or a network in which the mobile terminal is located. For example, the wireless communication unit may include a broadcast receiving module 111, a mobile communication module 112, a wireless internet module 113, a short-range communication module 114 and a location information module 115.

The broadcast receiving module 111 receives a broadcast signal and/or broadcast associated information from an external broadcast management server via a broadcast channel. The broadcast channel may include a satellite channel and a terrestrial channel. The broadcast management server may refer to a server that generates and transmits a broadcast signal and/or broadcast associated information or a server that receives a pre-generated broadcast signal and/or broadcast associated information and sends them to the mobile terminal. The broadcast associated information may include information associated with a broadcast channel, a broadcast program, or a broadcast service provider, etc. The broadcast signal may include not only a TV broadcast signal, a radio broadcast signal, and a data broadcast signal, but also a broadcast signal obtained by combining the data broadcast signal to the TV broadcast signal or the radio broadcast signal.

The broadcast associated information may be provided via a mobile communication network, and in this case, it may be received by the mobile communication module 112.

The broadcast associated information may exist in various formats. For instance, the broadcast associated information may exist in such formats as Electronic Program Guide (EPG) of Digital Multimedia Broadcasting (DMB), Electronic Service Guide (ESG) of Digital Video Broadcast-Handheld (DVB-H), and the like.

The broadcast receiving module 111 receives broadcast signals by using various types of broadcast systems. In particular, the broadcast receiving module 111 may receive digital broadcast signals by using digital broadcast systems such as Digital Multimedia Broadcasting-terrestrial (DMB-T), Digital Multimedia Broadcasting-satellite (DMB-S), Media Forward Link Only (MediaFLO™), Digital Video Broadcast-handheld (DVB-H), Integrated Services Digital Broadcast-Terrestrial (ISDB-T), and the like. The broadcast receiving module 111 may be configured to be suitable for certain broadcast systems that provide broadcast signals, as well as for the digital broadcasting systems.

Broadcast signals and/or broadcast associated information received via the broadcast receiving module 111 may be stored in the memory 160.

The mobile communication module 112 transmits/receives radio signals to/from at least one of a base station, an external mobile terminal and a server in a mobile communication network, and the like. Here, the radio signals may include a voice call signal, a video call signal, or various formats of data according to transmission/reception of text/multimedia messages.

The wireless Internet module 113 supports wireless network access. This module may be internally or externally coupled to the mobile terminal.

The short-range communication module 114 refers to a module for supporting short range communications. Some examples of short-range communication technology includes Bluetooth™, Radio Frequency IDentification (RFID), Infrared Data Association (IrDA), Ultra-WideBand (UWB), ZigBee™, and the like.

The location information module 115 is a module for checking or acquiring a location of the mobile terminal. For example, the location information module 115 may be embodied by using a GPS (Global Positioning System) module that receives location information from a plurality of artificial satellites. Here, the location information may include coordinate information represented by the latitude and longitude. For example, the GPS module may measure an accurate time and distance from three or more satellites and accurately calculate a current location of the mobile terminal according to trigonometry based on the three different distances. A method of acquiring distance and time information from three satellites and correcting an error with a single satellite may be used. In particular, the GPS module may acquire an accurate time together with three-dimensional speed information as well as the location of the latitude, longitude and altitude from the location information received from the satellites.

The A/V input unit 120 is configured to input an audio or video signal. The A/V input unit 120 may include a camera 121 and a microphone 122. The camera 121 processes image data of still pictures or videos obtained by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and process it into audio data. The processed audio (voice) data may be converted for output into a format transmittable to a mobile communication base station via the mobile communication module 112 in case of the phone call mode. The microphone 122 may include various types of noise canceling (or suppression) algorithms to cancel (or suppress) noise generated in the course of receiving and transmitting audio signals.

The user input unit 130 may generate key input data inputted by a user to control various operations of the mobile terminal. The user input unit 130 may include a keypad, a dome switch, a touch pad (e.g., a touch sensitive member that detects changes in resistance, pressure, capacitance, etc.), a jog wheel, a jog switch, and the like. In particular, when the touch pad is overlaid on the display unit 151 in a layered manner, it may be called a touch screen.

The sensing unit 140 detects a current status (or state) of the mobile terminal 100 such as an open/close state of the mobile terminal 100, a location of the mobile terminal 100, presence or absence of user contact with the mobile terminal, orientation of the mobile terminal 100, acceleration/deceleration of the mobile terminal 100, etc., and generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface with at least one external device connected with the mobile terminal 100. For example, the external devices may include wired/wireless headset ports, external power charger ports, wired/wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may be fabricated in the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data from the mobile terminal to an external device.

The output unit 150 is configured to provide outputs in a visual, audible, and/or tactile manner (e.g., audio signal, video signal, alarm signal, etc.). The output unit 150 may include the display unit 151, an audio output module 152, an alarm unit 153, and the like.

The display unit 151 may output information processed in the mobile terminal 100.

For example, when the mobile terminal 100 is in the phone call mode, the display unit 151 may display a User Interface (UI) or a Graphic User Interface (GUI) associated with a call or other communication. When the mobile terminal 100 is in the video call mode or the image capturing mode, the display unit 151 may display a captured and/or received image, a UI, a GUI, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED), a flexible display, a three-dimensional (3D) display, or the like. The mobile terminal 100 may include two or more display units (or other display means) according to its embodiment.

For example, the mobile terminal may include an external display unit 151*a* and an internal display unit 151*b*.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed by the mobile terminal 100. The audio output module 152 may include a speaker, a buzzer, or the like.

The alarm unit 153 may provide outputs to inform about an occurrence of an event of the mobile terminal 100. Typical events may include a call signal reception, a message reception, a key signal input, etc. In addition to audio or video outputs, the alarm unit 153 may provide outputs in a different manner to inform about an occurrence of an event.

For example, the alarm unit 153 may provide outputs in the form of vibrations (or other tactile means). When a call signal, a message, or some other incoming communication is received, the alarm unit 153 may provide tactile outputs (i.e., vibrations) to inform the user. By providing tactile outputs, the user can recognize the occurrence of various events. Outputs informing about the occurrence of an event may be also provided via the display unit 151 or the audio output module 152.

The memory 160 may store software programs or the like used for the processing and controlling performed by the controller 180, or may temporarily store inputted/outputted data (e.g., a phonebook, messages, still images, video, etc.).

The memory 160 may include at least one type of storage medium including a flash memory type, a hard disk type, a multimedia card type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM) magnetic memory, a magnetic disk, an optical disk, and the like. Also, the mobile terminal 100 may cooperate with a network storage device that performs the storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separated from the controller 180.

The power supply unit 190 receives external or internal power and supplies power required for the operations of the respective elements under the control of the controller 180.

Various embodiments described herein may be implemented in a computer-readable medium using, for example, computer software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments are implemented by the controller 180.

For a software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

So far, the mobile terminal has been described from the perspective of the functions. Hereinafter, external elements of the mobile terminal will be described from the perspective of their functions with reference to FIGS. 2A, 2B and 3.

The mobile terminal may be implemented in a variety of different configurations, including a folder-type, a bar-type, a swing-type, a slide-type, or the like. For the sake of brevity, the slide-type mobile terminal will be used as an example in the following description. However, the concepts and features described herein should not be limited to the slide-type mobile terminal, but can be applicable to any type of mobile terminal or other electronic device including the ones as mentioned above.

Figure 2A:
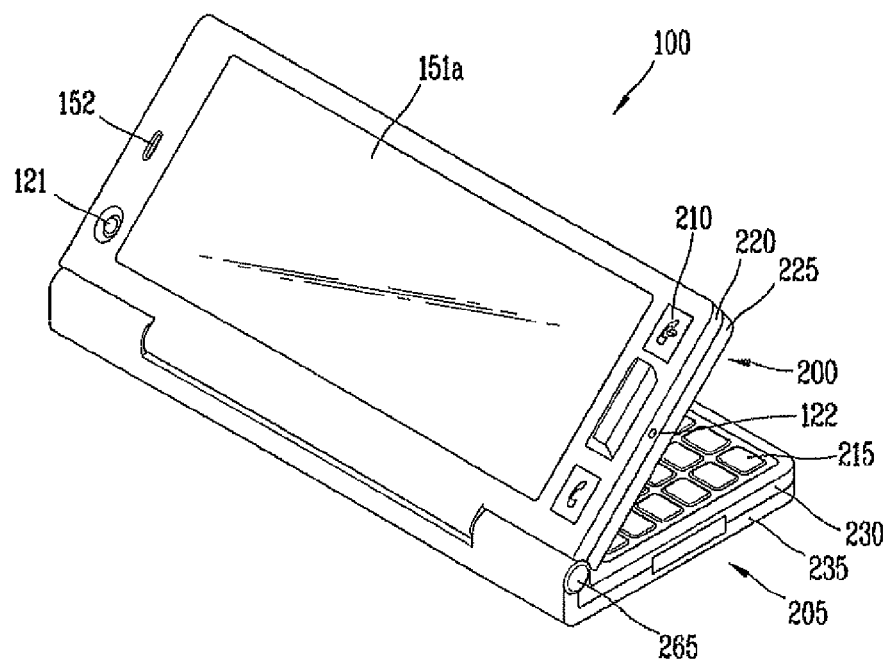
FIG. 2A is a front perspective view of the mobile terminal according to an embodiment of the present invention.

FIG. 2A is a front view of the mobile terminal according to an exemplary embodiment.

The mobile terminal may comprise a first body 200, and a second body configured to be opened from one side of the first body.

A state in which the first body 200 is disposed to overlap with the second body 205 may be called a closed configuration, and as shown in FIG. 2A, a state in which the first body 200 exposes at least a portion of the second body 205 may be called an open configuration.

The mobile terminal may usually operate in a standby mode in the closed configuration, but this mode can be released by user manipulation. Also, the mobile terminal may mainly function in a call mode in the open configuration, but may be changed to the standby mode according to user manipulation or after the lapse of a certain time.

At least one case (housing, casing, cover, etc.) constituting the external appearance of the first body 200 comprises a first front case 220 and a first rear case 225. Various electronic components may be installed inside the first front case 220 and the first rear case 225. One or more intermediate cases may be additionally disposed between the first front case 220 and the first rear case 225.

The cases can be formed by injection-molding a synthetic resin, or made of a metallic material such as stainless steel (STS) or titanium (Ti), or some other appropriate materials.

The first display unit 151a, the second display unit 151b, the audio output module 152, a camera 121 or a first user input unit 210 may be located on the first front case 220 and the first rear case 225 of the first body 200. The first display unit 151a and the second display unit 151b may have the same size or may have each different size.

The display units 151a and 151b may include LCD, OLED, and the like, that visually displays information. A touch pad may be overlaid in a layered manner on the display units 151a and 151b to allow the display units 151a and 151a to function as a touch screen to input information by the user's touches.

In one embodiment, when the first body 200 is in the closed configuration, the controller 180 may output information to the first display unit 151a, and when the first body 200 is opened, the controller 180 may transfer the image(s) displayed on the first display unit 151a from the first display unit 151a to the second display unit 151b.

In another embodiment, when the first body 200 is opened and the display output is changed from the first display unit 151a to the second display unit 151b, the controller 180 may receive a touch input via the first display unit 151a and display the touch input information as an indicator (pointer) in a particular shape. In addition, a particular function may be executed upon receiving the touch input. For example, a game may be displayed on the second display unit 151b, with a cursor displayed on the game controlled by touch inputs to the first display unit 151a. Alternatively, a spreadsheet or document may be displayed on the second display unit 151b, with a cursor displayed on the spreadsheet or document controlled by touch inputs to the first display unit 151a. Alternatively, a list of music or multimedia files may be displayed on the second display unit 151b, with a cursor displayed on the list of music or multimedia files controlled by touch inputs to the first display unit 151a. Alternatively, a camera display or camera control screen may be displayed on the second display unit 151b, with a cursor displayed on the camera display or camera control screen controlled by touch inputs to the first display unit 151a.

In another embodiment, when the first body 200 is opened, the controller 180 may output the same information on the first and second display units 151a and 151b. For example, two users may conveniently view the same games, document, or movie images with the mobile terminal. Alternatively, a camera or video display may be simultaneously displayed on the first and second display units 151a and 151b.

In another alternative embodiment, when the first body 200 is opened, the controller 180 may output different information to the first and second display units 151a and 151b. For example, a game image may be outputted on the first display unit 151a and a game setting screen image may be outputted on the second display unit 151b. Namely, the game screen image outputted on the first display unit 151a may be controlled by controlling setting outputted on the display unit 151b.

Also, it is not necessary for the touchscreen of first display unit 151a to control a cursor or pointer on the second display unit 151b. That is, actions relative to data displayed on the second display unit 151b may be initiated by a touch to the first display unit 151a, without use of cursor/pointer, or in concert with a cursor/pointer controlled by another element of the device.

Also, the previously described touch input may be a touch, swipe or drag input.

Also, additional buttons may be installed on the face of the device encompassing the first display unit 151a in areas not occupied by the touchscreen.

Also, the second display unit 151b may display a background image and a foreground image (i.e., a pop-up window). A cursor may also be displayed on the second display unit 151b, with the location of the cursor controlled by touches to the first display unit 151a. Functions may be executed on items beneath the cursor upon receiving a touch input to the first display unit 151a or to a button located on the device. Whether the touch input is correlated to the background or foreground image depending on where the cursor is located.

The audio output unit 152 may be implemented in the form of a speaker or in a form allowing an ear jack may be inserted.

The audio output modules 152 may be provided at both sides of the display unit 151a or 151b. At least one output thereof may be selectively controlled by the controller 180. For example, during call communication, voice may be outputted only via the audio output module provided at one side of the display unit 151a or 151b. Alternatively, the audio output modules may be configured to output sound related to respective output screen images of the display unit 151a and 151b. Of course, in this case, preferably, the sound may be outputted via separated ear jacks, and two users may view different images via the display units provided on front and rear surfaces.

The camera 121 may be implemented to be suitable for capturing images or video with respect to the user and so on. In addition, the camera 121 may be implemented at least one of the front surface and the rear surface, and may be implemented on the second body 205 as necessary. Namely, when the first body is in the closed configuration, camera capturing or video call communication can be performed, and even while the first body is in an open configuration, camera capturing and video call communication can be performed.

Like the first body 200, the case constituting the external appearance of the second body 205 is formed by a second front case 230 and a second rear case 235. A second user input unit 215 may be disposed on a front surface of the second body 205, specifically, on the second front case 230.

The second user input unit 215 may be implemented as a keypad formed as a Qwerty key arrangement as shown. The keypad may be displayed on display including a touchscreen or may be a set of electro-mechanical push buttons. Also, when the second user input unit 215 is display including a touchscreen, the touchpad of the first display unit 151a may control a cursor on the second user input unit 215. Alternatively, rather than a second user input unit 215 implemented as a keypad, another display may reside in the inner surface of the lower body. This display residing in the inner surface of the lower body may be in place of or in addition to the second display unit 151b. The touchpad of the first display unit 151a may control a cursor on the display residing in the inner surface of the lower body. If the display residing in the inner surface of the lower body is in addition to the second display unit 151b, the touchpad of the first display unit 151a may control a cursor that moves between the two screens on the interior of the device.

A third user input unit 245, the short-range communication module 114, the microphone 122, the interface unit 170 may be disposed on at least one of the second front case 230 and the second rear case 235. The microphone 122 may be implemented also on the first body 200 in a form suitable for receiving voice of the user or other sounds.

The first to third user input units 210, 215 and 245 may be generally called the manipulating unit 130, and various methods can be employed for the manipulation unit so long as they can be operated by the user in a tactile manner. For example, the user input units 130 can be implemented as a button, a dome switch or touch pad that can receive user commands or information according to user's pressing, pushing or touching, or implemented in the form of a wheel that rotates a key, a jog element, a joystick, or the like.

In terms of their functions, the first user input unit 210 is used for inputting commands such as start, end, scroll or the like, the second user input unit 215 is used for inputting numbers, characters, symbols, or the like, and the third user input unit 245 may operate as a hot key for activating a particular function within the mobile terminal.

The interface unit 170 may be used as a link (passage or path) through which the terminal can exchange data or the like with an external device. For example, the interface unit 170 may be implemented as one of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the mobile terminal, or the like.

The interface unit 170 may be a card socket for accommodating an external card such as a memory card for storing information.

The power supply unit 190 for supplying power to the terminal is located at the side portion of the second rear case 235. The power supply unit 190 may be, for example, a rechargeable battery that can be detached.

Figure 2B:
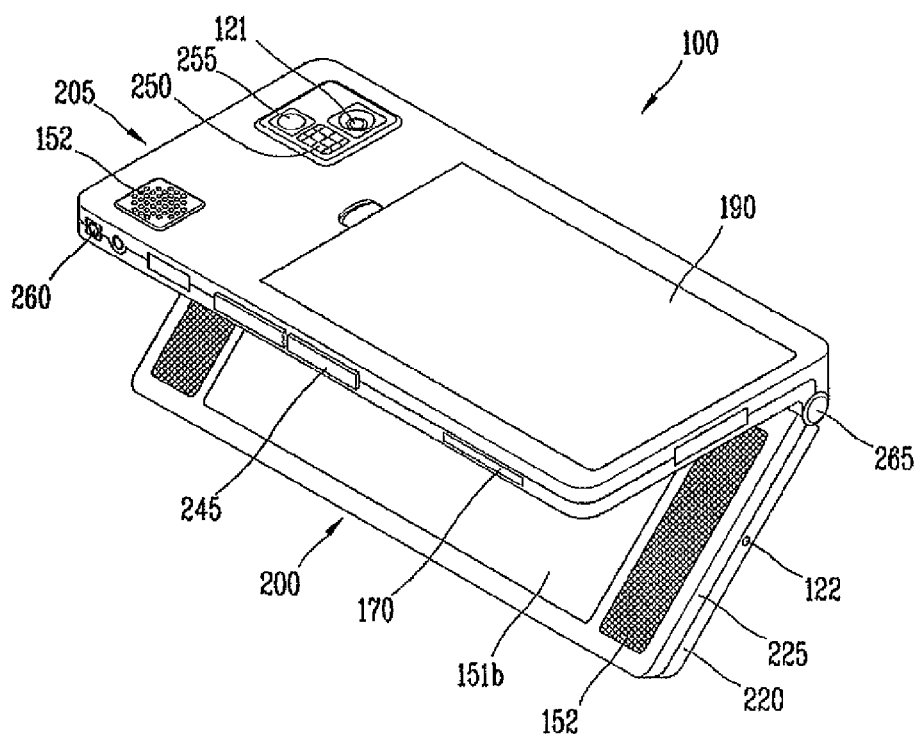
FIG. 2B is a rear view of the mobile terminal of FIG. 2A.

FIG. 2B is a rear perspective view of the mobile terminal of FIG. 2A according to an exemplary embodiment.

With reference to FIG. 2B, a camera 121 may additionally be disposed on a rear surface of the second rear case 235 of the second body 205. The camera 121 of the second body 205 may have an image capture direction which is substantially the opposite to that of the camera 121 of the first body 200, and may support a different number of pixels as that of the camera 121 of the first body.

For example, the camera 121 of the first body 200 may be used for low resolution (i.e., supporting a relatively small number of pixels) to quickly capture an image (or video) of the user's face and immediately transmit the same to the other party during video conferencing or the like. Meanwhile, the camera 121 of the second body 205 may be used for high resolution (i.e., supporting a relatively large number of pixels) in order to capture more detailed (higher quality) images (or video) which typically do not need to be transmitted immediately.

A flash 250 and a mirror 255 may be additionally disposed adjacent to the camera 121. When an image of the subject is captured with the camera 121 of the second body 205, the flash 250 illuminates the subject. The mirror 255 allows the user to see himself when he wants to capture his own image (self-image capturing) by using the camera 121 of the second body 205.

In the above description, the second camera 121 and so on is disposed on the second body 205, but such configuration is not meant to be limited.

For example, one or more of the elements (e.g., 260, 121 and 250 and 152 etc.), which are disposed on the second rear case 235 in the above description, may be mounted on the first body 200, mainly, on the first rear case 225. In this case, those elements disposed on the first rear case 225 can be protected (or covered) by the second body 205 in the closed configuration. In addition, even if the camera 121 of the second body is not provided, the camera module 121 may be configured to rotate (or otherwise be moved) to thus allow image capturing in various directions.

The second rear case 235 may further include an audio output module 152.

The audio output module 152 may implement a stereophonic sound function in conjunction with the audio output module 152 of the first body 200, and may be also used for sending and receiving calls in a speaker phone mode.

A broadcast signal receiving antenna 260 may be disposed at one side or region of the second rear case 235, in addition to an antenna that supports mobile communications. The antenna 260 can be configured to be retractable from the second body 205.

A hinge module 265 may be provided at one side of the first body 200 or the second body 205 to open the first body 200 or the second body 205 and may have such a form that is not exposed. A slide mechanism may also be provided at one side of the first body 200 or the second body 205 to open the first body 200 or the second body 205 and may have such a form that is not exposed.

The mobile terminal 100 as shown in FIGS. 1 to 2B may be configured to operate within a communication system which transmits data via frames or packets, including wired/wireless communication systems and satellite-based communication systems.

Such communication systems in which the mobile terminal according to the present invention can operate will now be described with reference to FIG. 3.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), and the global system for mobile communications (GSM), and the like. By way of non-limiting example only, further description will relate to a CDMA communication system, but such teachings apply equally to other system types.

Figure 3:
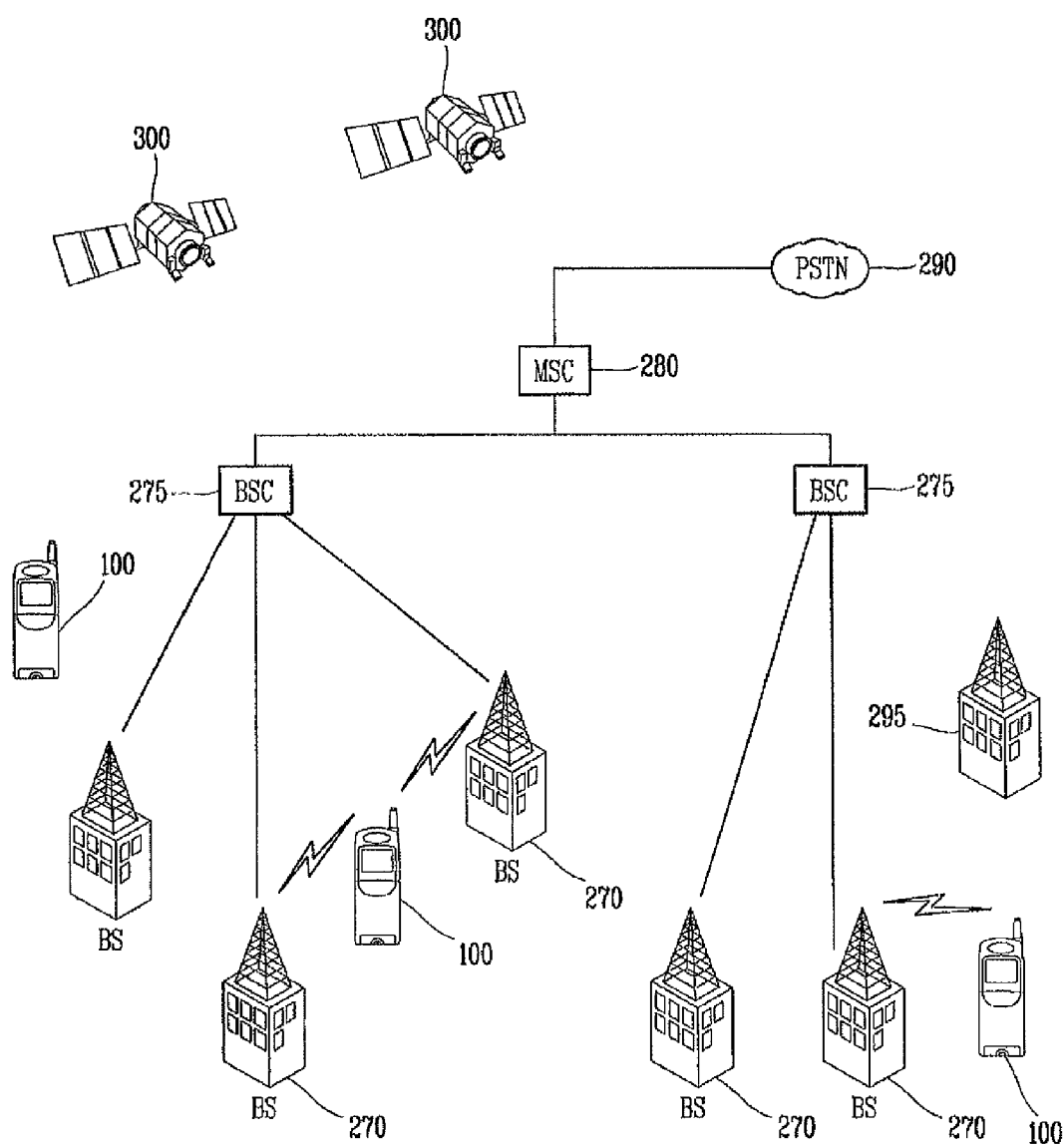
FIG. 3 is an exemplary view of a wireless communication system operable with the mobile terminal according to an embodiment of the present invention.

Referring to FIG. 3, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275. The BSCs 275 may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 3 may include a plurality of BSCs 275.

Each BS 270 may include one or more sectors, each sector having an omni-directional antenna or an antenna pointed in a particular direction radially away from the BS 270. Alternatively, each sector may include two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs). In such case, the term "base station" may be used to refer collectively to a single BSC 275 and at least one BS 270. The BSs may also denote "cell sites". Alternatively, individual sectors of a particular BS 270 may be referred to as a plurality of cell sites.

As shown in FIG. 3, a broadcasting transmitter (BT) 295 transmits a broadcast signal to the mobile terminals 100 operating within the system. The broadcast receiving module 111 as shown in FIG. 1 is provided within the terminal 100 to receive broadcast signals transmitted by the BT 295.

FIG. 3 shows several global positioning system (GPS) satellites 300. Such satellites 300 facilitate locating the position of at least one of the mobile terminals 100.

In FIG. 3, two satellites are depicted, but it is understood that useful positioning information may be obtained with two or less or more satellites. The GPS module 115 as shown in FIG. 1 is typically configured to cooperate with the satellites 300 to obtain desired position information.

Here, besides the GPS tracking technologies, any technologies that may track the location of the mobile terminals may be used to track the location of the mobile terminals. In addition, at least one of the GPS satellites 300 may selectively or additionally handle satellite DMB transmission.

As one of typical operations of the wireless communication system, the BSs 270 receive reverse-link signals from various mobile terminals 100. The mobile terminals 100 are engaging in calls, messaging, and other communications. Each reverse-link signal received by a particular base station 270 is processed within the particular BS 270.

The resulting data is forwarded to an associated BSC 275. The BSC provides call resource allocation and mobility management functionality including the orchestration of soft handoffs between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Figure 4A:
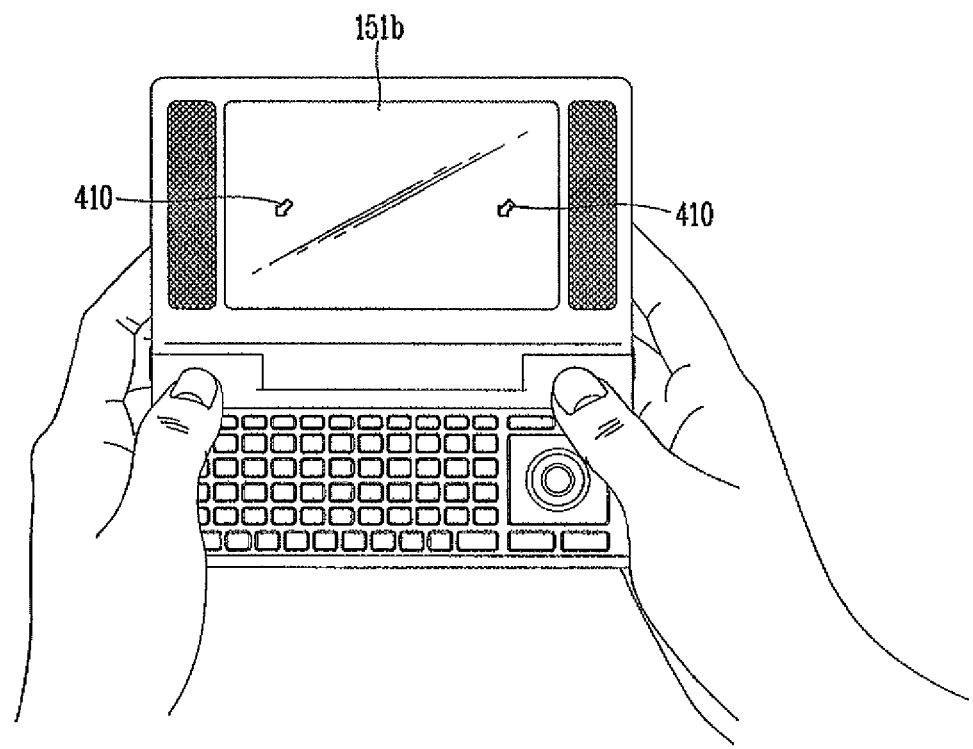
FIG. 4A is a front perspective view for explaining a holding pattern when a keypad of the mobile terminal is manipulated according to an embodiment of the present invention.
Figure 4B:
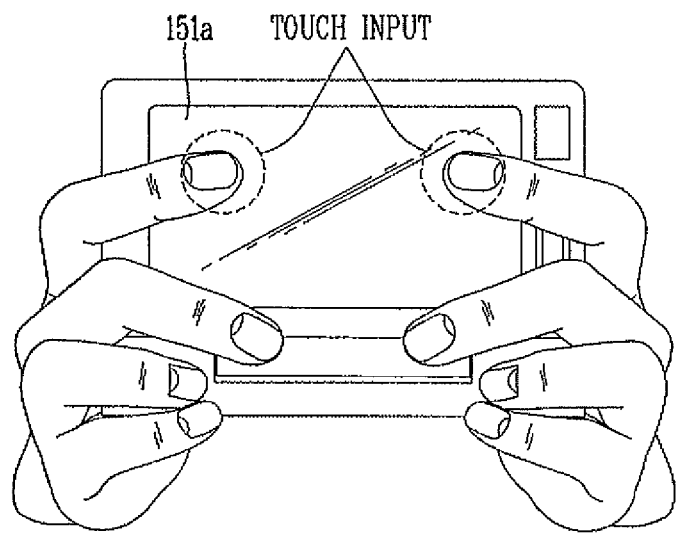
FIG. 4B is a rear perspective view for explaining a holding pattern when a touch is inputted to the mobile terminal according to an embodiment of the present invention.

FIG. 4A is a front perspective view for explaining a holding pattern when a keypad of the mobile terminal is manipulated according to an embodiment of the present invention, and FIG. 4B is a rear perspective view for explaining a holding pattern when a touch is inputted to the mobile terminal according to an embodiment of the present invention.

As described above, the second user input unit 215 disposed on the front surface of the second front case 230 of the second body 205 according to the present invention may have a keypad. The keypad may be configured to have a button for inputting a phone number and a button for inputting a particular function. The keypad may be configured as a Qwerty keyboard as shown in FIGS. 2A and 4A.

In order to use the Qwerty keyboard, the user may open the first body 200 of the mobile terminal and easily and stably hold the second body 205 with both hands as shown in FIG. 4A, whereby the user can simply and quickly manipulated the keypad with both thumbs. Key input information inputted via the keypad may be outputted to the second display unit 151*b* disposed on the first rear case 225.

When the first body 200 is opened, the controller 180 of the mobile terminal may change an output of information, which has been outputted on the first display unit 151 in the closed configuration of the first body 200, to the second display unit 151*b*.

Meanwhile, when the user holds the mobile terminal with both hands, the index fingers of both hands are positioned on the front case 220 as shown in FIG. 4B. Specifically, the index fingers of both hands are positioned on the first display unit 151a.

Accordingly, the controller 180 may activate the touch input function of the first display unit 151a and receive a touch by using the index fingers. When a touch is inputted via the first display unit 151a, the controller 180 may display the touch input information as pointers 410 of a particular shape on the second display unit 151b.

At this time, the controller 180 may detect a multi-touch. Namely, the controller 180 may display at least two touch input information inputted with the index fingers of both hands of the user. Or, the controller 180 may selectively recognize the first touch-input finger among the two fingers and may not recognize the later touch-input finger.

Accordingly, the user may execute a particular menu or a particular function linked to a particular item displayed on the second display unit 151b through a touch input onto the first display unit 151a. For example, after the pointers 410 are positioned on the particular menu of the second display unit 151b, a particular key button of the keypad may be pressed or double touches may be performed with the index fingers positioned on the first display unit 151a to execute a particular function.

Here, the double touches refer to successively touching a particular point on the touch screen twice within a particular time.

In addition, the controller 180 may perform multitasking by vertically (up/down) or horizontally (left/right) dividing the screen of the first display unit 151a or the second display unit 151b. For example, the screen of the second display unit 151b may be horizontally divided to output different task screen images (e.g., multimedia contents reproducing, broadcast outputting, message outputting, call information outputting) on each divided screen and control each divided screen upon receiving control inputs from both hands.

Figure 5:
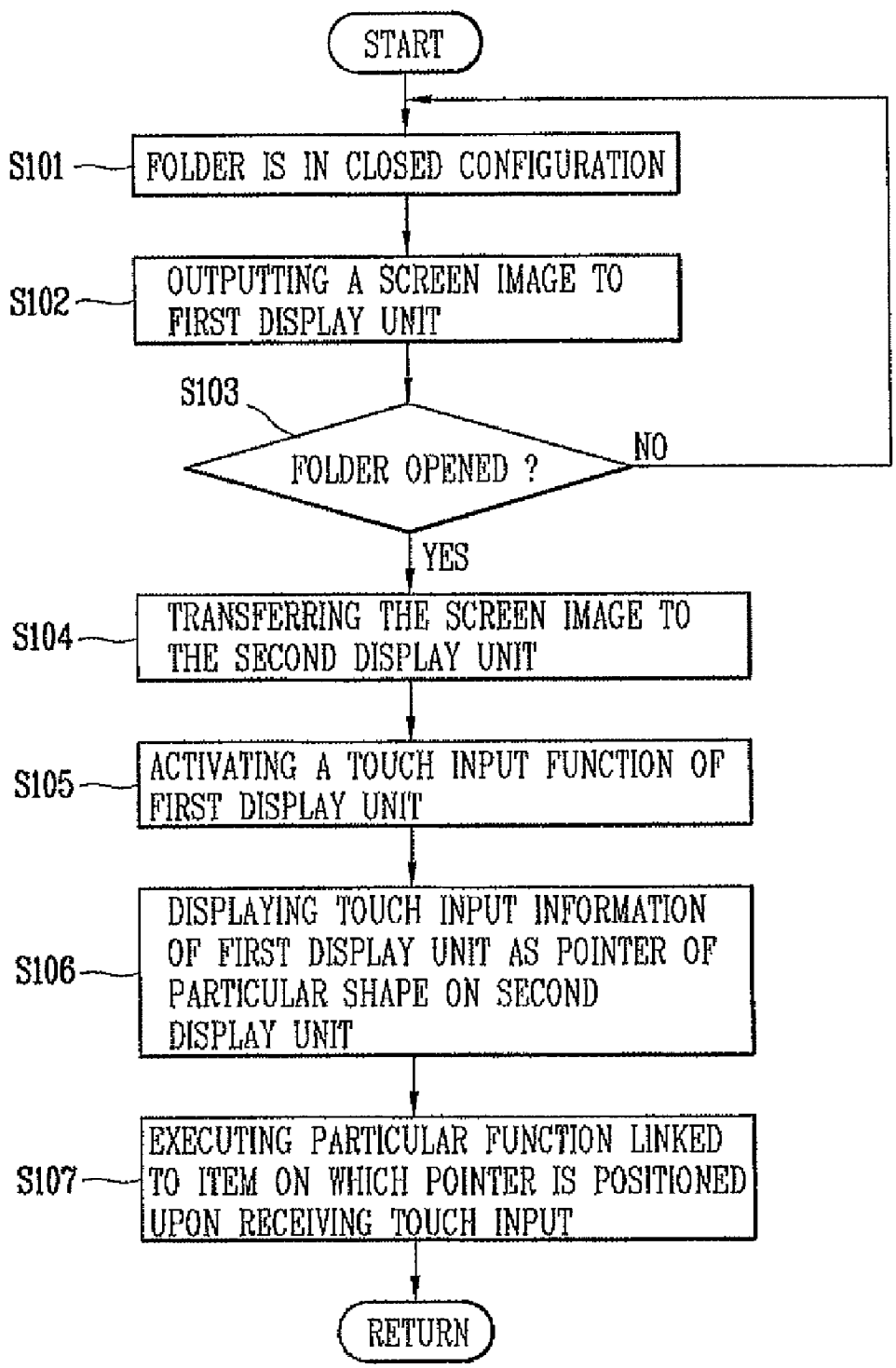
FIG. 5 is a flow chart illustrating the process of an operation of the mobile terminal according to an embodiment of the present invention.

FIG. 5 is a flow chart illustrating the process of an operation of the mobile terminal according to an embodiment of the present invention.

The controller 180 of the mobile terminal detects whether the mobile terminal including the first and second bodies 200 and 205 is opened, according to which the controller 180 controls the first and second display units 151a and 151b provided on the front and rear surfaces of the first body 200.

Figure 6:
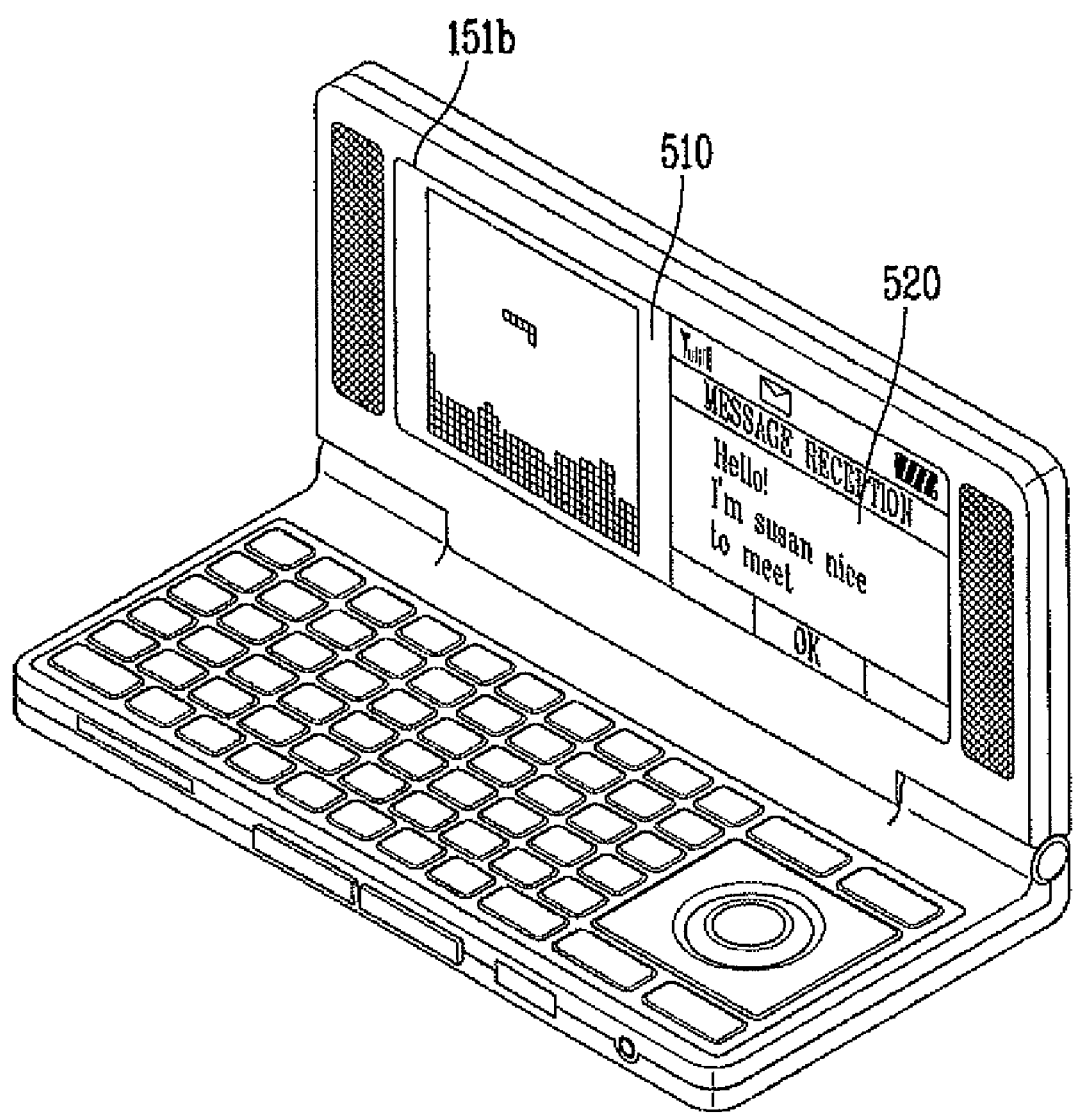
FIG. 6 is an exemplary view for explaining an operation for dividing and controlling a screen area of the mobile terminal according to an embodiment of the present invention.

While an execution screen image of a particular function is being outputted on the display unit 151a or 151b, if a function related to call communication (e.g., a voice call, a video call, a message reception) or multimedia contents reproducing, as shown in FIG. 6, the controller 180 divides the single screen into two regions 510 and 520 and outputs the screen image related to the call communication or contents reproducing to one region 520 and the execution screen image of the particular function to another region 510.

Figure 7:
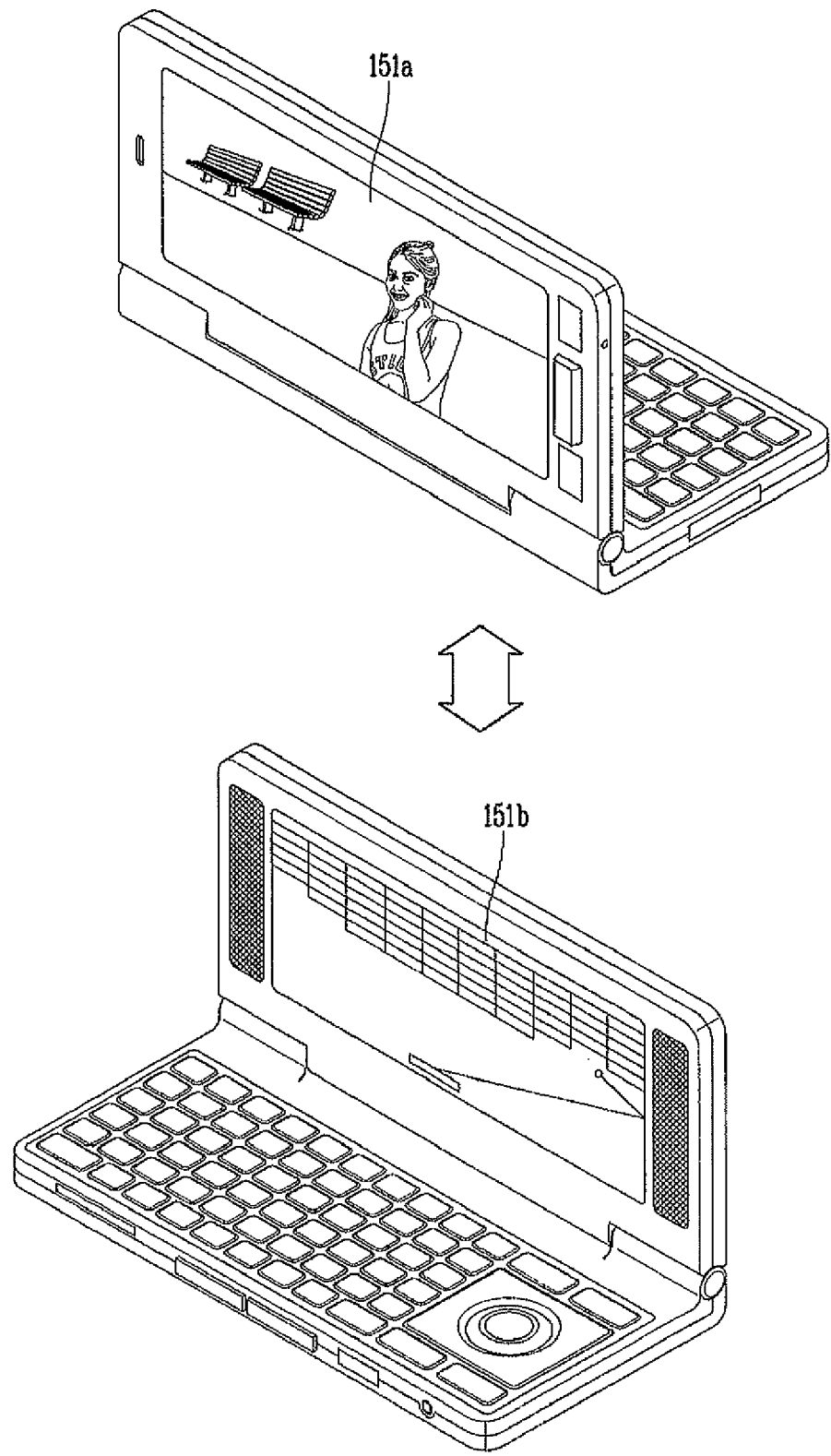
FIG. 7 is an exemplary view for explaining an operation of controlling a plurality of displays of the mobile terminal according to an embodiment of the present invention.

The functions outputted on the divided screens may be controlled with both hands of the user, respectively. Or, as shown in FIG. 7, different function execution screen images may be outputted on the first and second display units 151a and 151b. For example, a video reproducing screen image may be outputted on the first display unit 151a and a game screen image may be outputted on the second display unit 151b.

With reference to FIG. 5, when the first body 200 is in the closed configuration (S101), the controller 180 outputs an execution screen image of a particular function onto the first display unit 151a (S102). In this state, the user may manipulate the first user input unit 210 provided on the first front case or may execute a particular function by touching the first display unit 151a.

In this state, when the first body 200 is opened (S103), the controller 180 may change the executed screen image of the particular function outputted from the display unit 151a to the second display unit 151b so that the second display unit 151b may output the executed screen image of the particular function (S104).

In an alternative embodiment, step S104 is not performed, and the process continues from step S103 to step S105 described below. That is, when the first body 200 is opened (S103), the controller 180 may not change the screen output but output the same information as that of first display unit 151a on to the second display unit 151b. In yet another alternative embodiment, each display unit 151a or 151b may output different information. For example, the first display unit 151a may output multimedia contents reproducing screen image while the second display unit 151b may output a screen image related to call communication.

In an alternative embodiment, although the screen output of the first display unit 151a may be changed or transferred, the controller 180 may maintain the touch input function in an active state as it is (S105).

In an alternative embodiment, the controller 180 may detect a touch input to the first display unit 151a and display the pointers 410 of a particular shape on the second display unit 151b (S106).

The controller 180 may detect a touch inputted through the first display unit 151a and execute a particular function linked to an item on which the pointer 410 is positioned on a screen image outputted from the second display unit 151b (S107).

The previously described invention has at least the following advantages.

That is, when performing key inputs in the mobile terminal, the user can perform key inputs in a multi-manner by using buttons or touches while maintaining the way the user holds the mobile terminal, to thus improve user convenience.

Also, when the user inputs keys in the mobile terminal, he can perform a touch input with other fingers that are not in use for inputting key buttons while holding the mobile terminal, thus improving user convenience.

Also, in the mobile terminal having the displays on the front and rear surfaces of the folder, an output can be changed from the front display to the rear display according to whether or not the folder is opened, and a touch input can be received through the front display to execute a particular function outputted on the rear display, thus improving user convenience.

Also, in the mobile terminal having the displays on the front and rear surfaces of the folder, when the folder is opened, the same or different information may be displayed on both displays, and a touch input can be received through at least one display to execute a particular function outputted on the other display.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
a first body having an outer and an inner surface;
a first display unit on the outer surface of the first body and including a first touchscreen;
a second display unit on the inner surface of the first body;
a second body;
one of a hinge or slide connection connecting the first and second body and configured to enable a user to open and close the mobile terminal; and
a controller operatively connected to the first and second display unit, the controller configured to detect when the mobile terminal is opened or closed, the controller further configured to transfer a currently displayed first display from the first display unit to the second display unit when the first body is opened, and to subsequently execute a predetermined function upon receiving a first touch input to the first touchscreen,
wherein the controller is further configured to display a different display on the first display unit when the controller transfers the first display from the first display unit to the second display unit,
wherein the controller is configured to subsequently display on the second display unit, in response to a user input, a simultaneously display of a screen from a first application program on a first display area of the second display unit and a screen from a second application program, separate from the first application program, on a second display area of the second display unit,
wherein the controller is configured to simultaneously display and control a first pointer and a second pointer on the second display unit in response to first and second touch inputs to corresponding first and second areas of the first touchscreen as the predetermined function, and
wherein the first application program on the first display area of the second display unit and the second application program on the second display area of the second display unit are performed respectively by using the first pointer and the second pointer on the second display unit.

2. The mobile terminal of claim 1, wherein the second display unit comprises:
a second touchscreen.

3. The mobile terminal of claim 1, further comprising one of:
an electro-mechanical key pad on the second body; and
a third display unit.

4. The mobile terminal of claim 3, wherein the third display unit comprises:
a third touchscreen.

5. The mobile terminal of claim 1, wherein the controller is configured to
display and control the first pointer having a predetermined shape on the second display unit as the predetermined function, and
execute another predetermined function on an item indicated on the second display unit by the first pointer upon receiving a second touch input to the first touchscreen.

6. The mobile terminal of claim 1, further comprising:
an audio output device on at least one of side portions of the first display unit and side portions of the second display unit,
wherein the controller is configured to control the audio output device to selectively output audio data related to data displayed on one of the first and second display unit.

7. The mobile terminal of claim 1, further comprising:
a control button located on the second body,
wherein the controller configured to
display and control the first pointer having a predetermined shape on the second display unit as the predetermined function, and
execute a second predetermined function on an item indicated on the second display unit by the first pointer upon receiving an input from the control button.

8. The mobile terminal of claim 1, wherein the controller is configured to execute the predetermined function upon receiving a single touch, a multiple touch, a swipe or a drag input as the first touch input to the first touchscreen.

9. A method of controlling a display on a mobile terminal, the mobile terminal having a first body having an outer and an inner surface, a first display unit on the outer surface of the first body and including a first touchscreen, a second display unit on the inner surface of the first body, a second body, and one of a hinge or slide connection connecting the first and second body and configured to enable a user to open and close the mobile terminal, the method comprising:
detecting when the mobile terminal is opened or closed;
transferring a currently displayed first display from the first display unit to the second display unit when the first body is opened;
subsequently executing a predetermined function upon receiving a first touch input to the first touchscreen,
wherein a different display is displayed on the first display unit when the first display from the first display unit is transferred to the second display unit;
subsequently displaying, in response to a user input, on the second display unit a simultaneously display of a screen from a first application program on a first display area of the second display unit and a screen from a second application program, separate from the first application program, on a second display area of the second display unit; and
simultaneously displaying and controlling a first pointer and a second pointer on the second display unit in response to first and second touch inputs to corresponding first and second areas of the first touchscreen as the predetermined function,
wherein the first application program on the first display area of the second display unit and the second application program on the second display area of the second display unit are performed respectively by using the first pointer and the second pointer on the second display unit.

10. The method of claim 9, further comprising:
displaying and controlling the first pointer having a predetermined shape on the second display unit as the predetermined function, and
executing another predetermined function on an item indicated on the second display unit by the first pointer upon receiving a second touch input to the first touchscreen.

11. The method of claim 9, wherein a control button is located on the second body, the method comprising:
displaying and controlling the first pointer having a predetermined shape on the second display unit as the predetermined function, and
executing another predetermined function on an item indicated on the second display unit by the first pointer upon receiving an input from the control button.

12. The method of claim 9, further comprising:
executing the predetermined function upon receiving a single touch, a multiple touch, a swipe or a drag input as the first touch input to the first touchscreen.

* * * * *